US008935768B1

United States Patent
Tyree

(10) Patent No.: US 8,935,768 B1
(45) Date of Patent: Jan. 13, 2015

(54) CONTROLLING CLIENT ACCESS TO EMAIL RESPONSIVE TO EMAIL CLASS LEVELS

(71) Applicant: CA, Inc., Islandia, NY (US)

(72) Inventor: David S. Tyree, Denver, CO (US)

(73) Assignee: CA, Inc., New York, NY (US)

( * ) Notice: Subject to any disclaimer, the term of this patent is extended or adjusted under 35 U.S.C. 154(b) by 43 days.

(21) Appl. No.: 13/772,637

(22) Filed: Feb. 21, 2013

(51) Int. Cl.
*H04L 9/32* (2006.01)
*G06F 21/62* (2013.01)
*G06F 21/32* (2013.01)

(52) U.S. Cl.
CPC ............ *G06F 21/6209* (2013.01); *G06F 21/32* (2013.10)
USPC .................................. 726/7; 706/12

(58) Field of Classification Search
CPC ..... G06Q 10/107; G06Q 10/10; G06Q 30/02; H04L 12/585; H04L 51/12; G06F 17/30707
See application file for complete search history.

(56) References Cited

U.S. PATENT DOCUMENTS

| | | | | |
|---|---|---|---|---|
| 8,078,625 B1 * | 12/2011 | Zhang et al. | ................ | 707/748 |
| 8,477,796 B1 * | 7/2013 | Rao et al. | ...................... | 370/412 |
| 2003/0078985 A1 * | 4/2003 | Holbrook et al. | ............. | 709/213 |
| 2005/0198142 A1 * | 9/2005 | Yamakami | .................... | 709/206 |
| 2009/0300744 A1 * | 12/2009 | Guo et al. | ......................... | 726/7 |
| 2010/0100939 A1 * | 4/2010 | Mahaffey et al. | ................. | 726/4 |
| 2010/0205259 A1 * | 8/2010 | Vitaldevara et al. | .......... | 709/206 |
| 2010/0229246 A1 * | 9/2010 | Warrington et al. | ........... | 726/28 |
| 2010/0332428 A1 * | 12/2010 | McHenry et al. | ............... | 706/12 |
| 2013/0067546 A1 * | 3/2013 | Thavasi et al. | .................... | 726/7 |

* cited by examiner

*Primary Examiner* — Andrew Nalven
*Assistant Examiner* — Mary Li
(74) *Attorney, Agent, or Firm* — Myers Bigel Sibley & Sajovec, P.A.

(57) ABSTRACT

A class level of an email is determined responsive to defined rules for email classification. Client access to the email is then controlled responsive to the class level. One of a plurality of client authentication modes may be selected for authentication of the client responsive to the class level. The class level of the email may be determined responsive to an operational use of the email, a known keyword being present in content of the email, a source address of the email, a number of destination addresses of the email, an addressed resource of a user selectable link that is contained in a body of the email, characteristics of earlier email that the client deleted without reading, and/or various other rules.

23 Claims, 4 Drawing Sheets

CONTROLLING CLIENT ACCESS TO EMAIL RESPONSIVE TO EMAIL CLASS LEVELS

BACKGROUND

With the ever increasing role email serves in people's lives as a central source of aggregation of account information, a compromised email account can result in extensive loss of personal/financial information. For example, users accounts with Google's Gmail service have been compromised which resulted in identity theft and financial theft from those users. Google has attempted to reduce the vulnerability of their Gmail service by allowing users to opt-in for multi-factor authentication which provides an increased level of account security for its users. However, many users are reluctant to activate such multi-factor authentication because of the inconvenience and access limitations that are arise.

Multi-factor authentication is as a security approach that requires the user of a system to provide more than one form of verification in order to prove their identity and allow access to the system. Multi-factor authentication takes advantage of a combination of several factors of authentication; three such factors include verification by something a user knows (such as a user ID and password), something the user has (such as a smart card or a security token), and something the user is (such as the use of biometrics). Due to their increased complexity, authentication systems that use a multi-factor authentication configuration are harder to compromise than ones using a single factor.

Google's multi-factor email authentication process requires a user to provide a user ID and password combination along with a device based code (e.g., SMS text message) which provides information that is used during the web based authentication process. A user's mobile terminal can be operated to generate an application unique password which is communicated to the email server for combining with other information provided by the user to authenticate the user. A user is therefore denied access to the user's Gmail account when the user doesn't have present access to a particular operational mobile terminal, such as when the user is away from the mobile terminal, the mobile terminal has a dead battery, or the has been misplaced or lost. When another person obtains control of the user's mobile terminal, the user's Gmail account becomes vulnerable to compromise depending upon the strength of the user's password and the user's ability to access Google's authentication dashboard to disable the misplaced/lost mobile terminal from further use in the authentication process. When the user is unable to access Google's authentication dashboard in a timely manner after loss of the mobile terminal or is unaware that another person has gained control, insufficient account protection may be provided.

BRIEF SUMMARY

Various embodiments of the present disclosure are directed to controlling access to email responsive to class level of the email.

In one embodiment, a class level of an email is determined responsive to defined rules for email classification. Client access to the email is then controlled responsive to the class level.

The class level of the email may be determined responsive to an operational use of the email, a known keyword being present in content of the email, a source address of the email, a number of destination addresses of the email, an addressed resource of a user selectable link that is contained in a body of the email, characteristics of earlier email that the client deleted without reading, characteristics of earlier email that the client saved in a storage folder, and/or various other rules disclosed herein that have been established/learned for determining the class level of an email.

One of a plurality of client authentication modes may be selected for authentication of the client responsive to the class level. One email class level may require authentication of a client identifier and a password combination from the client for access, while another email class level may require authentication of the client identifier and the password combination from the client and further authentication of a security token from a client device. Another email class level may require authentication of the client identifier and the password combination from the client and further authentication of biometric data of the client. Still another email class level may require authentication of the client identifier and the password combination from the client and further authentication of a present location of a client device. Re-authentication of the client may be required at defined time intervals to maintain continued access to email having a defined class level. Other email class based authentication modes are disclosed herein.

Related computer program products, methods, and apparatuses are disclosed. It is noted that aspects described with respect to one embodiment may be incorporated in different embodiments although not specifically described relative thereto. That is, all embodiments and/or features of any embodiments can be combined in any way and/or combination. Moreover, other computer program products, methods, and apparatuses according to embodiments will be or become apparent to one with skill in the art upon review of the following drawings and detailed description. It is intended that all such additional computer program products, methods, and apparatuses be included within this description and be protected by the accompanying claims.

BRIEF DESCRIPTION OF THE DRAWINGS

Aspects of the present disclosure are illustrated by way of example and are not limited by the accompanying figures, in which like references indicating like elements.

DETAILED DESCRIPTION

Figure 1:
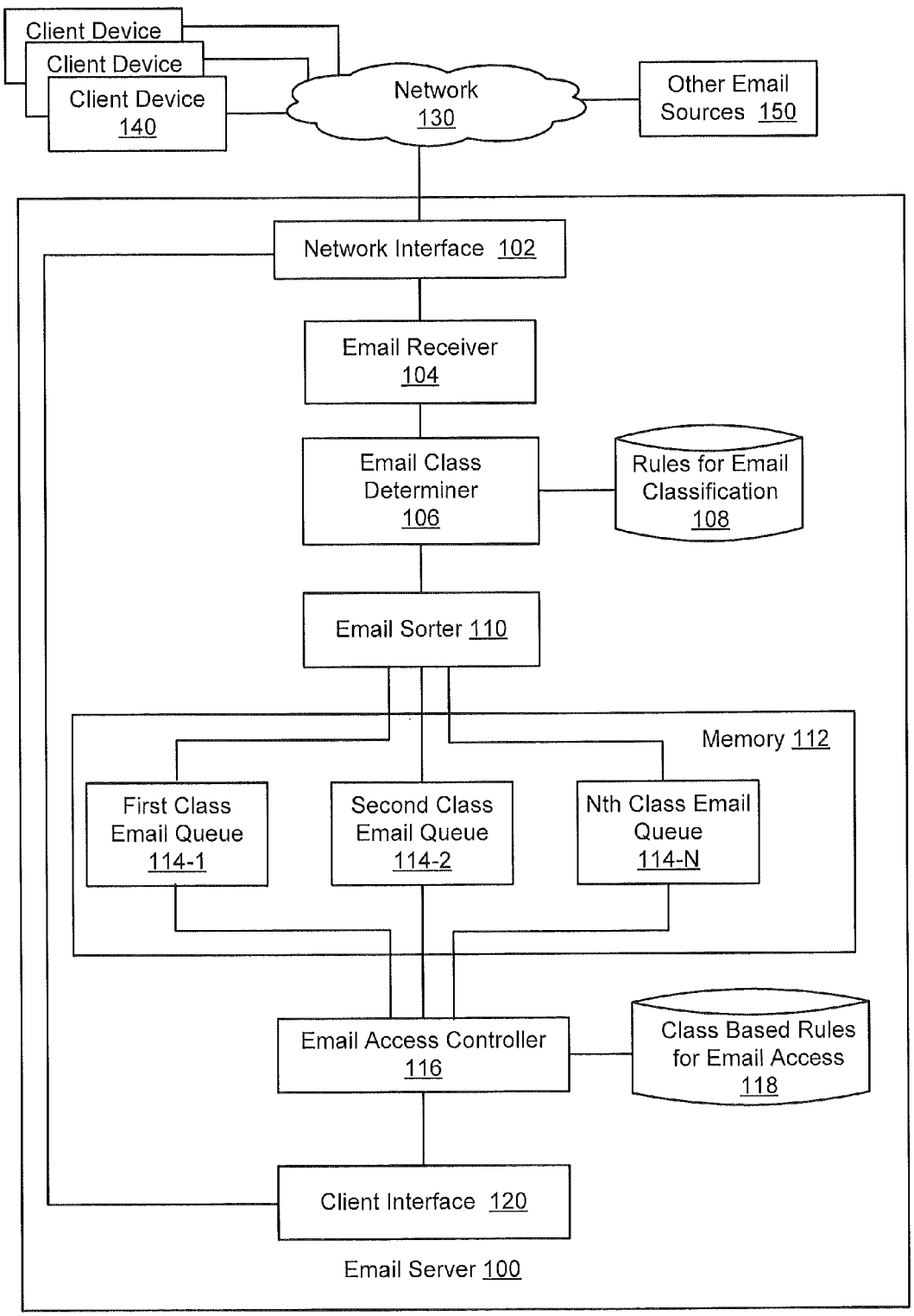
FIG. 1 illustrates a system with an email server that controls client access to email from client devices responsive to class levels of the email, according to some embodiments of the present disclosure.

Embodiments of the present disclosure will be described more fully hereinafter with reference to the accompanying drawings. Other embodiments may take many different forms and should not be construed as limited to the embodiments set forth herein. Like numbers refer to like elements throughout.

As explained above, some email service providers enable users to activate multi-factor authentication to increase the level of security processes that are involved in controlling access to their email. However, multi-factor authentication may undesirably burden the user's access to email and unnecessarily restrict the user's access to email. One or more embodiments disclosed herein may arise based on the present realization that such multi-factor authentication approaches control the access to an email account without regard to any characteristics of the particular email that is being handled by that email account. At least some email, and for some users—most email, would not be considered sufficiently sensitive (e.g., confidential) to make a higher factor authentication desirable for controlling access to that email. Instead, a user may desire to be provided access to non-sensitive or lower sensitive level email using a less burdensome reduced security level factor of authentication, and desire to be provided access to higher sensitive level email using a higher security level factor of authentication.

Therefore, in some embodiments, email is classified into levels of varying sensitivity classes, with each of the levels of sensitivity class being associated with different rules that are used to control client access to that sensitivity class level of email. This approach can allow users to have easier access to low sensitive emails through less secure authentication steps, and be provided higher levels of security for higher sensitive email through more secure authentication process steps.

By way of a non-limiting illustrative example, a user can define two passwords for the user's email account: 1) a lower sensitivity password, and 2) a more complex (e.g., lengthier, more random content password, etc.) higher sensitivity password or other higher level of authentication. A user can define that lower sensitive level emails have certain characteristics, including newsletters, emails from family, and other defined characteristics. For these lower sensitivity level emails, the user can access them by logging in using only the lower sensitivity password. However, for higher sensitivity level emails (which do not have the defined characteristics of the low sensitivity level emails), the user would be required to enter the higher sensitivity password or a combination of both the lower sensitivity password and the higher sensitivity password, or other higher level of authentication to access those emails.

In this approach, the level of multi-factor authentication is controlled based on the class of email that is to be accessed. One user email account may contain a plurality of different defined classes of email, and each different class of email may have different defined rules that control the user's access to that class of email.

FIG. 1 illustrates a system with an email server 100 that controls client access to email from client devices 140 responsive to classification (class) levels of the email, according to some embodiments of the present disclosure. Referring to FIG. 1, the email server 100 includes a network interface 102 that communicatively connects the email server 100 through one or more data networks 130 (e.g., public and/or private networks, wired or wireless networks) to the client devices 140 and other email sources 150. The client devices 140 can include, for example, desktop computers, notebook computers, netbook computers, tablet computers, smart phones, and/or any other user device that can be operated to send email to the email server 100 and/or to access email from the email server 100. The client devices 140 may access email from the email server 100 via, for example, an email application (e.g., Microsoft Outlook) or a web browser interface (e.g., Gmail website).

An email is received through the network interface 102 by an email receiver 104, and an email class determiner 106 determines the class level of the email responsive to established rules for email classification 108. The email can be stored in memory 112 with an indication of the determined class level.

Alternatively, as shown in FIG. 1, and email sorter 110 can store up the email in one of the plurality email queues 114-1 to 114-N, in the memory 112, that is selected responsive to the determined class level. For example, email that are determined to correspond to a first class level are stored in a first class email queue 114-1, email that are determine a course on the second class level are stored in a second class email queue 114-2, and, so on, with email that are determined to correspond to a N'th class level are stored in a corresponding N'th class email queue 114-N (where N is a plural number). The email may thereby be sorted among a plurality of different email storage queues in the memory 112.

Clients can access the stored email via email access requests transmitted by the client devices 140 and/or other network nodes through the data network 130, the network interface 102, and a client interface 120. The client interface 120 may, for example, correspond to an application programming interface that is provided by the email server 100 for interfacing to an email application (e.g. Microsoft Outlook, web browser interface, etc.) on the client devices 140. An email access controller 116 controls client access to stored email responsive to class-based rules that have been established for email access 118.

Figure 2:
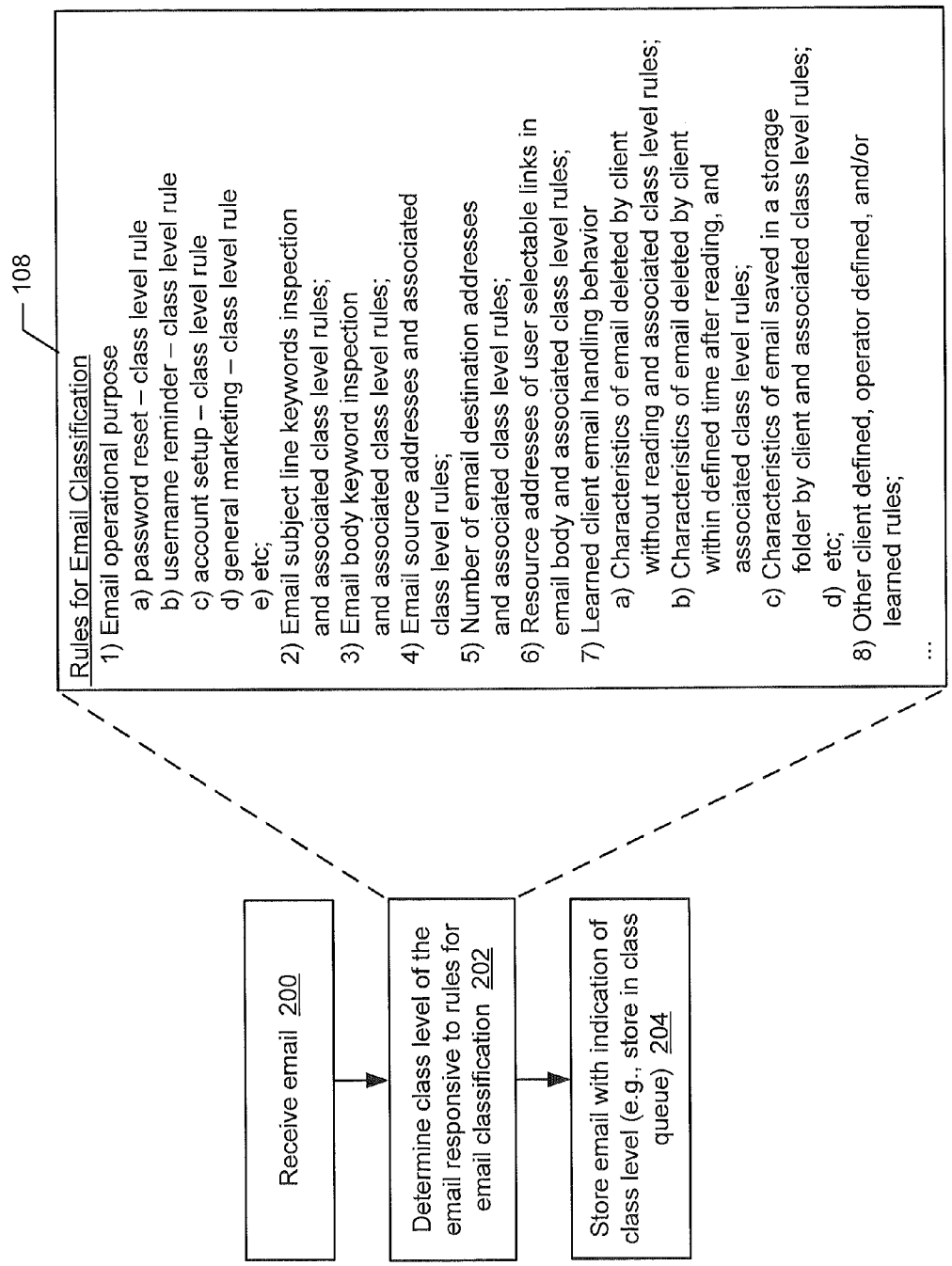
FIG. 2 illustrates example operations by an email server or another network node for determining a class level of an email responsive to rules that have been defined for email classification, according to some embodiments of the present disclosure.

FIG. 2 illustrates example operations by the email server 100 or another network node for determining a class level of an email responsive to rules that have been defined for email classification, according to some embodiments of the present disclosure. An email is received (block 200) by the email receiver 104, and a class level of the email is determined (block 202) by the email class determiner 106 responsive to rules that have been established for email classification (block 202). The rules may reside in, for example, a rules repository 108 in the memory 112.

The rules for email classification may include, but are not limited to, one or more of the rules illustrated in the rules repository 108 of FIG. 2.

In one embodiment, an operational use by a service provider system of the email can be determined, and the class level of the email can be determined based on that operational use (e.g., password reset, username reminder, account setup, general marketing materials, etc.). One rule can define a class level that is to be associated with email relating to resetting a client password for a client account (e.g., email account, shopping account, financial account, etc.). Another rule can define a class level that is to be associated with email relating to reminding or resetting a username for an account and/or an account identifier. Another rule can define a class level that is to be associated with email relating to setting up (establishing) a client account. Another rule can define a class level that is to be associated with email relating to general marketing of products and/or services in which no sensitive client information is contained. As can be appreciated, the varying levels of client sensitive information contained in the various different operational uses of email can be associated with different levels of classes, so that access to the different types of email can be controlled according to different authentication processes. For example, email relating to general marketing may be accessed with a less secure client authentication process then email relating to password reset, username reminder, and account setup.

In another embodiment, the textual content of the email can be inspected to identify presence of a known keyword, and the class level of the email can be determined responsive to the known keyword. The rules can associate the known keywords with different class levels. The keywords may be defined by a client (e.g., a client provided list of keywords), an email service provider, and/or an application developer. The keywords may alternatively or additionally be determined using a learning process (e.g., a Bayesian classification process). For example, keywords may be learned from content of email that is classified by other processes (e.g., may a client, email service provider, etc). Keywords may be indicative of sensitive account information (e.g., passwords, user IDs, account permissions/settings), purchasing (e.g., credit card information, purchase confirmations), etc., which can be associated by rules with one or more email classes that will trigger more restrictive control of access to emails containing those keywords.

In another embodiment, a source address of the email can be determined, and the class level the email committed terminal responsive to the source address. Thus, for example, emails from certain individuals and/or businesses can be associated with differing email classes based upon the rules. Emails from unknown individuals and/or businesses can be associated with an email class that triggers a lower level of client authentication, while emails from certain defined individuals and/or businesses can be associated with an email class that triggers a higher level of client authentication to provide more restrictive control of access to those emails. The rules associating defined source addresses and/or types of source addresses (e.g., associated with individuals, business, etc) to different class levels may be defined by a client, an email service provider, and/or an application developer.

In another embodiment, the number of destination addresses of the email can be determined, and the class level of email can be determined responsive to the number of destination addresses. Thus, for example, email that is sent to at least a threshold number of recipients may be determined to be less sensitive than email that is sent to less than a threshold number of recipients. Accordingly, the number of recipients of an email can be used an indication of the level of sensitivity that a client would attribute to that email. Access to the less sensitive email can be controlled according to a lower level of client authentication.

In another embodiment, the presence of a user selectable link that is contained in a body of the email is identified. An address of a resource that is linked to the user selectable link is identified. The class level of the email is determined responsive to the address of the resource. For example, an email that contains a user selectable link addressed to a business website at which the client has an account can be associated with an email class that trigger a higher level of client authentication for access to that email. In contrast, an email that contains a user selectable link addressed to an unknown website at which the client has no known association can be associated with an email class that triggers a lower level of client authentication for access to that email.

Rules for handling email may be dynamically configured based on observed client behavior.

Email that is deleted without reading may be classified differently than email that a client reads before deleting, so that access to those different types of email can be controlled differently. When a client deletes an earlier email without reading it, characteristics of the earlier email can be identified and those characteristics can be used to determine the class level of a presently received email. The characteristics that can be identified can include the source address of the email, keywords contained in the subject line of the email, keywords came contained in the body of the email, etc. Thus, for example, when a client deletes an email from a particular business without reading it, future email that is received from the same business can be associated with an email class that triggers a lower level of client authentication for access to those emails.

Similarly, when a client deletes an earlier email within a defined time after reading the email, characteristics of the earlier email committed identified and those characteristics can be used to determine the class level of a presently received email. The characteristics that can be identified can include the source address of the email, keywords contained in the subject line of the email, keywords came contained in the body of the email, etc. Thus, for example, when a client deletes an email from a particular business within a defined time (e.g., 10 seconds) after reading it, future email that is received from the same business can be associated with an email class that triggers a lower level of client authentication for access to those emails.

Email that that a client considered sufficiently important to cause the client to store the email into a storage folder (e.g., any one of available storage folders or defined ones of the storage folders) may be classified differently than email that a client does not store into a storage folder, so that access to those different classes of email can be controlled differently. When a client saves an earlier email into a storage folder, characteristics of the earlier email can be identified and those characteristics can be used to determine the class level of a presently received email. The characteristics that can be identified can include other destination addresses of the email, the source address of the email, keywords contained in the subject line of the email, keywords came contained in the body of the email, etc. Thus, for example, when a client saves an email from a particular business into a defined storage folder, future email that is received from the same business can be associated with an email class that triggers a higher level of client authentication for access to those emails. Different folders may be associated with different class levels, so that characteristics of email that are stored into different folders generate rules that associate those characteristics with different email claims for classification of future received email.

Although various embodiments have been described in the context of the rules 108 illustrated in FIG. 2, other rules may be used to determine the classification for received email, and those rules may be defined by, for example, a client, an email service provider, an application developer, and/or learned over time.

Figure 3:
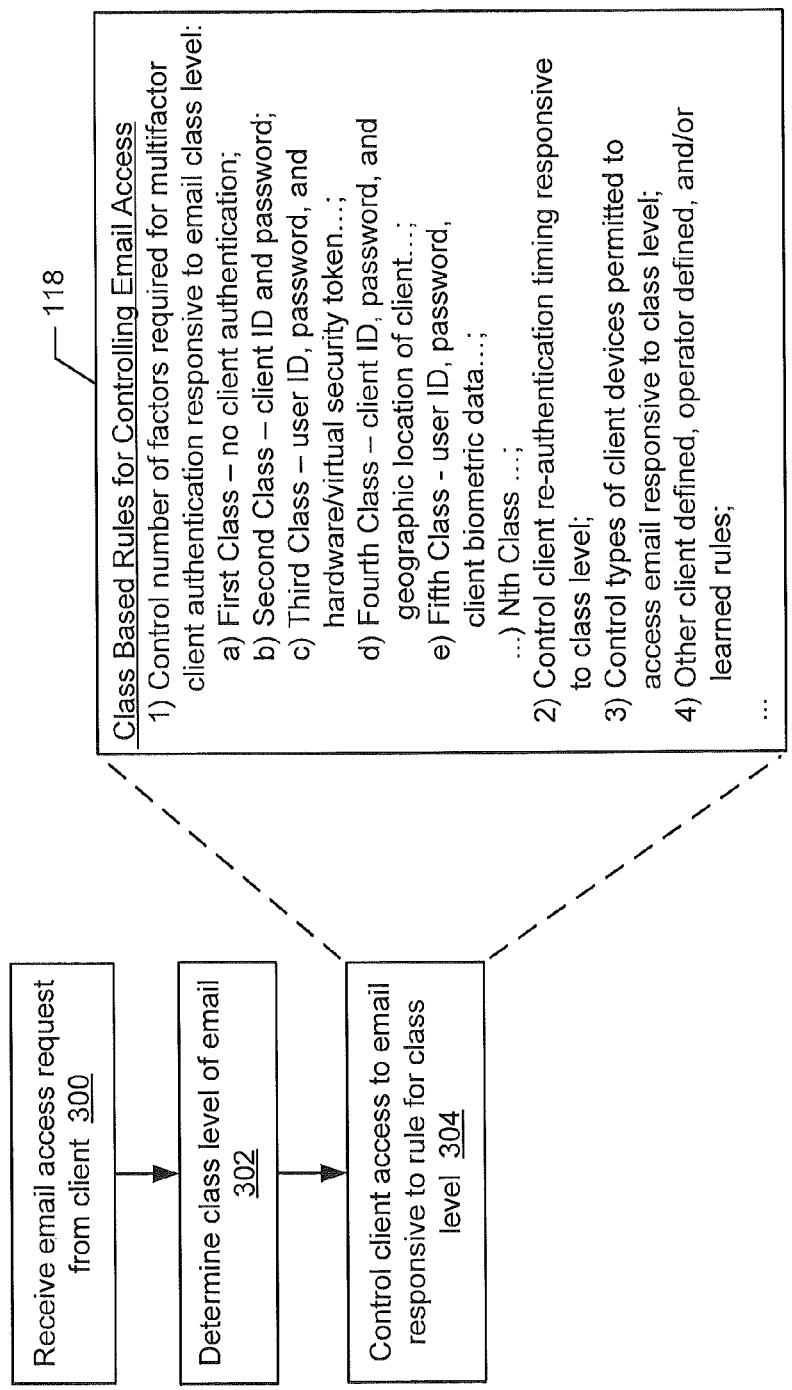
FIG. 3 illustrates example operations by an email server or other network node for determining a class level of an email and controlling client access to the email responsive to a rule defined for the class level, according to some embodiments of the present disclosure.

FIG. 3 illustrates example operations by the email server 100 or another network node for determining a class level of an email and controlling client access to the email responsive to a rule defined for the class level, according to some embodiments of the present disclosure. An email access request is received (block 300) from a client device 140. The email access controller 116 or another device determines (block 302) the class level of the email, such as by determining which of the class-based email queues 114-1 to 114-N the email is stored in, or the indication of the class level that is stored with the email. The email access controller 116 controls (block 304) the client's access to the email responsive to one or more rules that have been established for the determined class level. The rules may reside in, for example, a rules repository 118 in the memory 112.

The rules for email classification may include, but are not limited to, one or more of the rules illustrated in the rules repository 118 of FIG. 3.

In one embodiment, the steps by which a client is authenticated for access to a computer service are controlled responsive to the email class level. In one embodiment, one of a plurality of client authentication modes is selected responsive to the class level determined for the email. The client is authenticated responsive to the selected one of the plurality of client authentication modes. Client access to the email is then controlled responsive to the authentication of the client.

In the non-limiting example rules of FIG. 3, a first class of email triggers selection of an authentication mode that doesn't involve client authentication (e.g., any email access request to email of the first class will be allowed access). In contrast, a second class of email triggers selection of an authentication mode that requires proper authentication of a client ID and password that is received as part of the email access request from the client (e.g., client or client' device 140 completes a log-in process to gain access to the client's email account on the email server 100). A third class of email triggers selection of an authentication mode that requires a combination of the proper authentication of a client ID and password and further authentication of a security token from the client device 140 (e.g., an identifier of the client device, an application on the client device, etc.). A fourth class of email triggers selection of an authentication mode that requires a combination of the proper authentication of a client ID and password and further authentication of biometric data of the client. A fifth class of email triggers selection of an authentication mode that requires a combination of the proper authentication of a present location (e.g., the present geographic location of the client device 140 matching a known/approved geographic location for the client, the identifier of a present edge node providing network service to the client device 140 matching a known/approved identifier, etc.) of the client device 140. Although five example classes have been illustrated in FIG. 3 and explained herein, any plural number of email classes may be provided. Moreover, any combination of the example email classes and associated authentication modes and/or other classes and authentication modes may be used.

In another embodiment, a client is authenticated and the client's access to the email is controlled responsive to the authentication of the client. The client is then re-authenticated responsive to expiration of a time interval since the authentication of the client. The client's access to the email is further controlled responsive to the re-authentication of the client. The time interval is controlled responsive to the class level. For example, a client may be granted access without a time constraint to email having a first class. However, the client may be required to be re-authenticated (e.g., reenter a user ID and password combination, etc.) at a defined periodic rate to maintain access to email having a second class. The time interval that triggers the re-authentication can be controlled responsive to the class level. A more sensitive class level of email may require more frequency re-authentication of the client (e.g., every 10 minutes) than less sensitive class level of email (e.g., every hour).

In another embodiment, the type of client device that is permitted access to the email is controlled responsive to the class level. For example, a sensitive class level of email may be restricted to being accessed by non-mobile land-line network based device (e.g., home computers with cable-modem/DSL-modem network access), while a less sensitive class level of email may be accessed from any type of client device (e.g., mobile and non-mobile client devices, having WiFi network access, cellular network access, satellite network access, land-line modem network access, etc).

Although various embodiments have been described in the context of the rules 118 illustrated in FIG. 3, other rules may be used to control client access to email based on email classes, and those rules may be defined by, for example, a client, an email service provider, an application developer, and/or learned over time.

Figure 4:
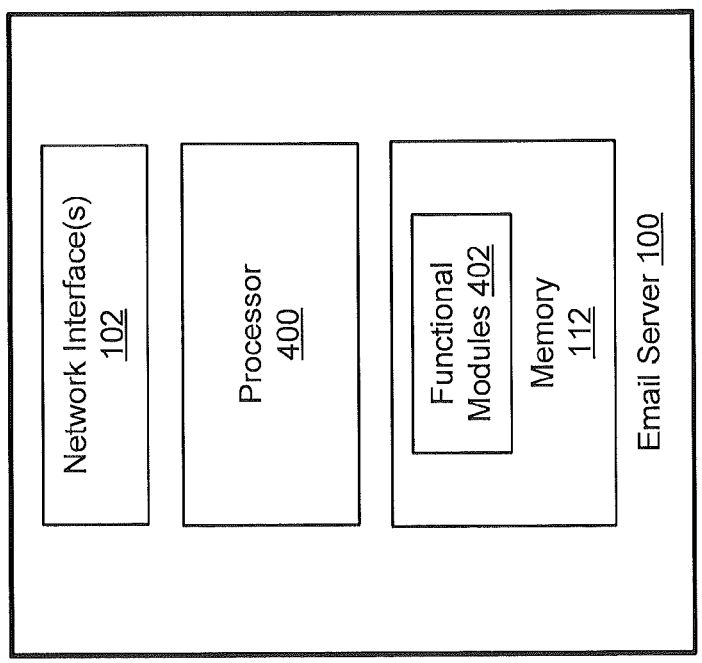
FIG. 4 is a block diagram of an email server or other network node configured according to some embodiments of the present disclosure.

FIG. 4 is a block diagram of the email server 100 or other network node configured according to some embodiments of the present disclosure. Functionality of the email server 100 may reside in a single server device or may be distributed across a plurality of networked server devices. The email server 100 includes a processor 400, a memory 112, and a network interface 102. The network interface 102 can be configured to communicate with client devices 140 and other email sources 150, such as through the network 130. The processor 400 may include one or more instruction execution circuits, such as a general purpose processor and/or special purpose processor (e.g., microprocessor and/or digital signal processor) that may be collocated (e.g., within a same circuit package, connected to a same backplane, enclosed within a same computer housing, etc) or distributed across one or more data networks. The processor 400 is configured to execute computer readable program code of functional applications 402 residing in the memory 112, described below as a computer readable storage medium, to perform at least some of the operations and methods described herein as being performed by an email server in accordance with one or more embodiments disclosed herein. Although various embodiments are disclosed herein in the context of an email server, other types of network nodes (e.g., devices that communication through a data network) may be configured to perform at least some of the operations and methods described herein.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a buffered repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as JavaScript, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable storage medium that when executed can direct a computer, other programmable data processing apparatus, or other devices to function in a particular manner, such that the instructions when stored in the computer readable storage medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A computer program product controlling client access to email, the computer program product comprising:
   a computer readable non-transitory storage medium having computer readable program code embodied in the non-transitory storage medium, the computer readable program code comprising:
   computer readable program code to determine a class level of an email responsive to defined rules for email classification, comprising:
   computer readable program code to identify presence of a user selectable link that is contained in a body of the email;
   computer readable program code to identify an address of a resource linked to the user selectable link; and
   computer readable program code to determine the class level of the email responsive to the address of the resource, comprising determining a first class level responsive to determining that the user selectable link is addressed to a website at which the client has a defined association, and determining a second class level responsive to determining that the user selectable link is addressed to another website at which the client does not have the defined association; and computer readable program code to determine a level of client authentication that is used to control the client's access to the email responsive to the class level.

2. The computer program product of claim 1, further comprising:

computer readable program code to store the email in one of a plurality of email queues that is selected responsive to the address of a resource linked to the user selectable link.

3. The computer program product of claim 1, further comprising:

computer readable program code to determine the first class level responsive to determining that the user selectable link is addressed to a business website at which the client has an account, to determine the second class level responsive to determining that the user selectable link is addressed to an unknown website at which the client has no known association, and to trigger a higher level of client authentication for access to the email when the first class level is determined and to trigger a lower level of client authentication for access to the email when the second class level is determined.

4. The computer program product of claim 1, wherein the computer readable program code to determine the class level of the email responsive to the defined rules for email classification, comprises:

computer readable program code to determine an operational use by a service provider system of the email; and computer readable program code to determine the class level of the email based on the operational use.

5. The computer program product of claim 1, wherein the computer readable program code to determine the class level of the email responsive to the defined rules for email classification, comprises:

computer readable program code to inspect textual content of the email to identify a known keyword; and computer readable program code to determine the class level of the email responsive to the known keyword.

6. The computer program product of claim 1, wherein the computer readable program code to determine the class level of the email responsive to the defined rules for email classification, comprises:

computer readable program code to determine a source address of the email; and computer readable program code to determine the class level of the email responsive to the source address of the email.

7. The computer program product of claim 1, wherein the computer readable program code to determine the class level of the email responsive to the defined rules for email classification, comprises:

computer readable program code to determine a number of destination addresses of the email; and computer readable program code to determine the class level of the email responsive to the number of destination addresses.

8. The computer program product of claim 1, wherein the computer readable program code to determine the class level of the email responsive to the defined rules for email classification, comprises:

computer readable program code to identify characteristics of earlier email that the client has deleted without reading; and computer readable program code to determine the class level of the email responsive to the characteristics of the earlier email that the client has deleted without reading.

9. The computer program product of claim 1, wherein the computer readable program code to determine the class level of the email responsive to the defined rules for email classification, comprises:

computer readable program code to identify characteristics of earlier email that the client has deleted within a defined time after reading; and computer readable program code to determine the class level of the email responsive to the characteristics of the earlier email that the client has deleted within a defined time after reading.

10. The computer program product of claim 1, wherein the computer readable program code to determine the class level of the email responsive to the defined rules for email classification, comprises:

computer readable program code to identify characteristics of earlier email that the client has saved in a storage folder; and computer readable program code to determine the class level of the email responsive to the characteristics of the earlier email that the client has saved in a storage folder.

11. The computer program product of claim 1, wherein the computer readable program code to control client access to the email responsive to the class level, comprises:

computer readable program code to select one of a plurality of client authentication modes responsive to the class level;

computer readable program code to authenticate the client responsive to the selected one of the plurality of client authentication modes; and computer readable program code to control client access to the email responsive to the authentication of the client.

12. The computer program product of claim 1, wherein:

the computer readable program code to control client access to the email responsive to the class level, comprises:

computer readable program code to control client access to the email responsive to authentication of a client identifier and a password combination from the client when the class level is the second class level; and computer readable program code to control client access to the email responsive to authentication of a client identifier and a password combination from the client and further authentication of a security token from a client device when the class level is the first class level.

13. The computer program product of claim 1, wherein:

the computer readable program code to control client access to the email responsive to the class level, comprises:

computer readable program code to control client access to the email responsive to authentication of a client identifier and a password combination from the client when the class level is the second class level; and computer readable program code to control client access to the email responsive to authentication of a client identifier and a password combination from the client and further authentication of biometric data of the client when the class level is the first class level.

14. The computer program product of claim 1, wherein:
the computer readable program code to control client access to the email responsive to the class level, comprises:
computer readable program code to control client access to the email responsive to authentication of a client identifier and a password combination from the client when the class level is the second class level; and
computer readable program code to control client access to the email responsive to authentication of a client identifier and a password combination from the client and further authentication of a present location of a client device when the class level is the first class level.

15. The computer program product of claim 1, wherein:
the computer readable program code to control client access to the email responsive to the class level, comprises:
computer readable program code to authenticate the client; and
computer readable program code to initiate re-authentication of the client upon expiration of a time interval since a last authentication of the client based on the class level being the first class level.

16. The computer program product of claim 1, wherein the computer readable program code to control client access to the email responsive to the class level, comprises:
computer readable program code to control the type of client device that is permitted access to the email responsive to the class level.

17. A method by a network node for controlling client access to email, the method comprising:
determining a class level of an email responsive to defined rules for email classification, comprising identifying presence of a user selectable link that is contained in a body of the email, identifying an address of a resource linked to the user selectable link, and determining the class level of the email responsive to the address of the resource comprising determining a first class level responsive to determining that the user selectable link is addressed to a website at which the client has a defined association, and determining a second class level responsive to determining that the user selectable link is addressed to another website at which the client does not have the defined association; and
determining a level of client authentication that is used for controlling client's access to the email responsive to the class level.

18. The method of claim 17, wherein:
determining the class level of the email responsive to the defined rules for email classification, further comprises:
determining the first class level responsive to determining that the user selectable link is addressed to a business website at which the client has a defined association; and
determining the second class level responsive to determining that the user selectable link is addressed to another an unknown website at which the client does not have the defined association; and
determining a level of client authentication that is used for controlling client's access to the email responsive to the class level comprises triggering a higher level of client authentication for access to the email when the first class level is determined and to trigger a lower level of client authentication for access to the email when the second class level is determined.

19. The method of claim 17, wherein determining the class level of the email responsive to the defined rules for email classification, comprises:
determining a source address of the email; and
determining the class level of the email responsive to the source address of the email.

20. The method of claim 17, wherein:
determining a level of client authentication that is used for controlling client's access to the email responsive to the class level comprises:
controlling client access to the email responsive to authentication of a client identifier and a password combination from the client when the class level is the second class level; and
controlling client access to the email responsive to authentication of a client identifier and a password combination from the client and further authentication of a present location of a client device when the class level is the first class level.

21. The method of claim 17, wherein determining a level of client authentication that is used for controlling client's access to the email responsive to the class level, further comprises:
selecting one of a plurality of client authentication modes responsive to the class level;
authenticating the client responsive to the selected one of the plurality of client authentication modes; and
controlling client access to the email responsive to the authentication of the client.

22. The method of claim 17, wherein:
determining a level of client authentication that is used for controlling client's access to the email responsive to the class level, comprises:
authenticating the client;
controlling client access to the email responsive to the authentication of the client;
re-authenticating the client responsive to expiration of a time interval since the authentication of the client based on the class level being the first class level; and
further controlling client access to the email responsive to the re-authentication of the client.

23. A network node comprising:
a processor; and
a memory coupled to the processor and comprising rules for email classification and computer readable program code that when executed by the processor causes the processor to perform operations comprising:
determining a class level of an email responsive to the defined rules for email classification, comprising identifying presence of a user selectable link that is contained in a body of the email, identifying an address of a resource linked to the user selectable link, and determining the class level of the email responsive to the address of the resource comprising determining a first class level responsive to determining that the user selectable link is addressed to a website at which the client has a defined association, and determining a second class level responsive to determining that the user selectable link is addressed to another website at which the client does not have the defined association; and
determining a level of client authentication that is used to control the client's access to the email responsive to the class level.

* * * * *